United States Patent
Sano

(10) Patent No.: US 6,332,352 B1
(45) Date of Patent: Dec. 25, 2001

(54) ENGINE TORQUE-DETECTING METHOD AND AN APPARATUS THEREFOR

(75) Inventor: Taketoshi Sano, Iwata (JP)

(73) Assignee: Yamaha Hatsudoki Kabushiki Kaisha, Iwata (JP)

(*) Notice: Subject to any disclaimer, the term of this patent is extended or adjusted under 35 U.S.C. 154(b) by 0 days.

(21) Appl. No.: 08/833,767

(22) Filed: Apr. 9, 1997

Related U.S. Application Data

(63) Continuation of application No. 08/207,273, filed on Mar. 7, 1994, now abandoned.

(30) Foreign Application Priority Data

Mar. 8, 1993 (JP) .................................................. 5-070715

(51) Int. Cl.$^7$ .............................................. G01M 15/00
(52) U.S. Cl. .......................................................... 73/117.3
(58) Field of Search .............................. 73/115, 116, 117.3

(56) References Cited

U.S. PATENT DOCUMENTS

| | | |
|---|---|---|
| 3,444,730 | 5/1969 | Bysarovich . |
| 3,978,718 * | 9/1976 | Schorsch ............................. 73/117.3 |
| 4,567,755 * | 2/1986 | Ootsuka et al. .................... 73/117.3 |
| 4,633,707 * | 1/1987 | Haddox .............................. 73/117.3 |
| 4,691,288 * | 9/1987 | Kay et al. .............................. 73/116 |
| 4,739,649 * | 4/1988 | Tanaka ................................ 73/117.3 |
| 4,744,243 * | 5/1988 | Tanaka ................................ 73/117.3 |
| 4,781,059 * | 11/1988 | Suzuki et al. ...................... 73/117.3 |
| 4,843,870 * | 7/1989 | Citron et al. .......................... 73/116 |
| 4,892,075 * | 1/1990 | Iriyama et al. ..................... 73/117.3 |
| 4,898,025 * | 2/1990 | Weyland ............................. 73/117.3 |
| 5,127,262 * | 7/1992 | Demizu et al. ....................... 73/115 |

FOREIGN PATENT DOCUMENTS

| | | |
|---|---|---|
| 0153004 | 8/1985 | (EP) . |
| 0199431 | 10/1986 | (EP) . |

OTHER PUBLICATIONS

1. IEEE Transactions on Vehicular Technology, vol. 38, No. 3, Aug. 1989, New York US pp. 180–192, XP000101478 G. Rizzoni 'A Stochastic Model for the Indicated Pressure Process and the Dynamics of the Internal Combustion Engine' (the whole document).
2. Patent Abstracts of Japan, vol. 6, No. 133 (P–129) (1011) Jul. 20, 1982 & JP–A–57–57235 (Toyota Jidosha Kogyo K.K.) Apr. 6, 1982.
3. European Search Report dated Nov. 18, 1994.

* cited by examiner

*Primary Examiner*—Eric S. McCall
(74) *Attorney, Agent, or Firm*—Knobbe, Martens, Olson & Bear LLP

(57) ABSTRACT

A method and apparatus for measuring the instantaneous torque of an engine by measuring the change in pressure in the combustion chamber at two crank angles. The crank angles are chosen to approximate the time when the change in pressure is the greatest and when the pressure is the greatest and the change in pressure is zero. These crank angles may be either determined by measuring the values or by approximating the crank angles at which the values will exist. In some instances, the torque is measured by summing the change in pressures during the time interval and in other methods the torque is measured by determining the pressure differences at the two crank angles.

58 Claims, 8 Drawing Sheets

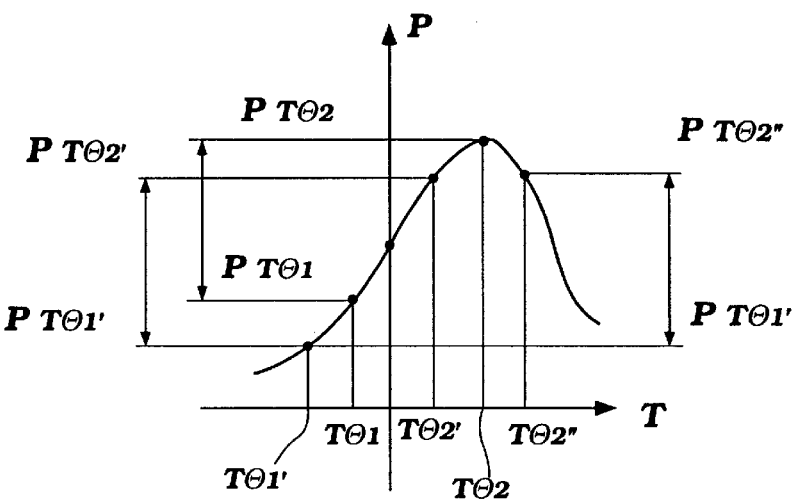

Figure 10

$$T\Theta 1 = T\Theta o + T\alpha R = \frac{T\Theta o}{360} + \frac{T \times \alpha \times R}{360} = \frac{1}{360}\left(T \times \Theta o + T \times \alpha \times \frac{60}{T}\right) = \mu T + \upsilon$$

Figure 11

$$\begin{pmatrix} \Theta 1 = \Theta o + \Theta x - \alpha R \\ \Theta 1 = \Theta o + \alpha / R \\ \Theta 1 = \Theta o + \alpha / R \\ \Theta 1 = \Theta o + \alpha / \log R \end{pmatrix} \begin{pmatrix} \Theta 2 = \Theta 1 + \beta \\ \Theta 2 = \Theta 1 + \beta - \alpha \bullet R \\ \Theta 2 = \Theta 1 + \beta + \gamma / R \\ \Theta 2 = \Theta 1 + \beta + \gamma / R \\ \Theta 2 = \Theta 1 + \beta + \gamma / \log R \end{pmatrix}$$

R is engine speed (RPM)
$\Theta x$, $\alpha$, $\beta$, $\gamma$ are constants

Figure 12

$$\begin{pmatrix} T\Theta 1 = \mu T + \upsilon \\ T\Theta 1 = \mu T + \upsilon T^2 \\ T\Theta 1 = \mu T + \upsilon T\ T \\ T\Theta 1 = \mu T + \upsilon\ T/\log T \end{pmatrix} \quad \begin{pmatrix} T\Theta 2 = T\Theta 1 + \lambda T \\ T\Theta 2 = T\Theta 1 + \lambda T + K \\ T\Theta 2 = T\Theta 1 + \lambda T + KT^2 \\ T\Theta 2 = T\Theta 1 + \lambda T + KT\ T \\ T\Theta 2 = T\Theta 1 + \lambda T + K\ T/\log T \end{pmatrix}$$

*Figure 13*

$$\begin{pmatrix} \Theta 1 = \Theta o + \Theta x - \alpha' / T \\ \Theta 1 = \Theta o + \alpha' T \\ \Theta 1 = \Theta o + \alpha'\ T \\ \Theta 1 = \Theta o - \alpha' / \log T \end{pmatrix} \quad \begin{pmatrix} \Theta 2 = \Theta 1 + \beta' \\ \Theta 2 = \Theta 1 + \beta' - \alpha'/T \\ \Theta 2 = \Theta 1 + \beta' + \alpha' T \\ \Theta 2 = \Theta 0 + \beta' + \alpha'\ T \\ \Theta 2 = \Theta 0 + \beta' - \alpha'/\log T \end{pmatrix}$$

*Figure 14*

$$R = \frac{60 \times \Theta T}{360 \times T'} = \frac{\Theta T'}{60 \times T'}$$

$$T = \frac{360}{\Theta T'} T'$$

Figure 15

$\Theta 2 - \Theta 2' = \Delta\Theta \longrightarrow \Theta 1 - \Theta 1' = C \bullet \Delta\Theta \qquad C < 1$ $\Theta 2'' - \Theta 2 = \Delta\Theta' \longrightarrow \Theta 1 - \Theta 1' = C' \bullet \Delta\Theta' \qquad C' < 1$

Figure 16

$T\Theta 2 - T\Theta 2' = \Delta T\Theta \qquad T\Theta 1 - T\Theta 1' = C \bullet \Delta T\Theta \qquad C < 1$ $T\Theta 2'' - T\Theta 2 = \Delta T\Theta' \qquad T\Theta 1 - T\Theta 1' = C' \bullet \Delta T\Theta' \qquad C' < 1$

Figure 17

ENGINE TORQUE-DETECTING METHOD AND AN APPARATUS THEREFOR

This application is a continuation of U.S. patent application Ser. No. 08/207,273, filed Mar. 7, 1994 now abandoned.

BACKGROUND OF THE INVENTION

This invention relates to an engine torque-detecting method and apparatus therefore, and more particularly to an improved method and apparatus for measuring engine torque during running.

It is well known to attempt to improve the efficiency and exhaust emission control of an internal combustion engine to operate it in such a manner as to accurately control the amount of fuel supplied to the engine. Also, other engine parameters are controlled in order to maintain good combustion with the minimum amount of fuel for environmental and efficiency reasons. In order to ensure stable running, however, it is necessary to ensure that adequate amounts of fuel are provided to the engine and that other running conditions are accurately controlled. Therefore, there is a need to measure the actual engine output so as to ensure stability in its operation.

For example, it is known that fuel economy and exhaust emission control may be achieved by operating the engine on a so-called "lean burn" system at least at low and partial lows. With lean burn running the fuel-air mixture supplied to the combustion chamber is less than stoichiometric. However, it is also known that the limits of lean burn may be readily determined by measuring the output torque of the engine. When the output torque falls below a predetermined value it is known that the stability and engine running speed will deteriorate significantly. Therefore, it is desirable to be able to measure the output torque of the engine during its running so as to permit optimization of the lean burn running.

Obviously, it is not possible to measure the engine output in the form of torque through the use of normal measuring apparatus employed for engine testing. That is, the torque-measuring devices used to determine the performance of the engine cannot be incorporated feasibly in a motor vehicle.

There have, therefore, been proposed methods for attempting to measure the engine output torque during its running by measuring some other parameter of the engine. It has been found that pressure in the combustion chamber can be utilized to project engine output torque and ensure stability in running. One method for measuring the engine output torque has been to sample the pressure readings at a number of output shaft angles during a single cycle of operation beginning near the end of the compression stroke and ending during the power or expansion stroke and then predict the engine torque from these readings. However, the necessity of taking multiple readings at varying crank angles provides a very complicated system, and normal computers cannot make the necessary calculations in the time period to adjust the engine to maintain stability without time lags. These problems are particularly acute when the engine is running at a high speed.

It is has also been proposed to measure or estimate the output torque of the engine by measuring the peak combustion chamber pressure. Such a system obviously only requires one pressure reading. However, it has been found that this value is not as closely related to engine output torque as was thought, particularly when cycle-to-cycle measurements are being made and compared with each other.

It is, therefore, a principal object of this invention to provide an improved method and apparatus for measuring the torque output of an engine during its running and per cycle.

It is a further object of this invention to provide an improved method and apparatus for measuring engine torque per cycle that can be utilized with a minimum number of readings.

In conjunction with measuring the torque of the engine and other engine measurements, it is desirable to be able to determine accurately the engine speed. It is commonly the practice to employ with engines a crankshaft or other shaft position detector that outputs a pulse when the shaft rotates to a particular angle. These sensors normally employ a permanent magnet and a related coil, in which the pulse is generated as the magnet and coil are brought into registry with each other. These sensors are normally employed not only to determine a reference angle position for the shaft, such as top dead center, but also to measure engine speed by counting the number of pulses generated in a time period. Although these devices are particularly useful, they provide indications of average engine speed, and not engine speed during a single revolution or a portion of a revolution. With some measurements, such as the measurement of engine torque, it is desirable to measure the instantaneous angular rotational speed of the engine shaft during a single cycle of engine operation.

It is, therefore, a further object of this invention to provide an improved measuring device that can provide not only a reference signal indicative of engine shaft position but also includes means for determining instantaneous engine shaft angular velocity in less than a complete revolution.

As has been previously noted, methods for determining or predicting engine torque have employed sensors for sensing the pressure in the combustion chamber. Such pressure sensors are well known and normally employ piezoelectric devices, which are exposed to the combustion chamber pressure. These devices actually output a first signal that is indicative of the change in pressure exerted on the piezoelectric device. An amplifier circuit is incorporated in conjunction with the piezoelectric device to receive the first signal and convert it into a second signal that will provide an actual pressure reading.

In some instances it is desirable to measure engine torque by actually measuring absolute pressure at certain time intervals. On the other hand, some torque measuring methods may be utilized to measure the accumulated pressure over a time period by integrating a differential pressure signal.

It is, therefore, a still further object of this invention to provide a method for utilizing a pressure sensor to derive either instantaneous change in pressure signals or absolute pressure signals.

SUMMARY OF THE INVENTION

This invention is adapted to be embodied in a method and apparatus for measuring the torque of an engine during its running and for a selected cycle. The engine has a combustion chamber and an output shaft that is driven by combustion in the combustion chamber. Means are provided for measuring the pressure in the combustion chamber and also for measuring the output shaft angle.

In accordance with a method for practicing the invention, the combustion chamber pressure is measured between no more than two different crank angles, and the engine output torque is determined from these two measurements.

In accordance with an apparatus for performing this invention, means are provided for reading the combustion chamber pressure at two distinct crank angles and calculating the engine torque from these two readings.

In accordance with a method embodying another feature of the invention, instantaneous engine speed for a portion of the rotation of the output shaft of an engine is measured. The engine comprises a shaft driven by the engine and an associated fixed component of the engine that is juxtaposed to a portion of the shaft. A permanent magnet is fixed to one of the shaft portion and the component and a coil is fixed to the other of the shaft portion and the component and is adapted to output a pulse upon the passage of the coil and the permanent magnet upon rotation of the shaft for indicating the angular position of the shaft. The method comprises the steps of determining the shaft angle when the maximum positive pulse is generated by the coil, determining the shaft angle when the maximum negative pulse is generated by the coil, and measuring the time interval between the maximum positive and negative pulses to determine instantaneous shaft rotational speed.

Another feature of the invention is adapted to be embodied in a method of sensing both absolute pressure in an engine combustion chamber and the instantaneous change in pressure. This method comprises a piezoelectric device that is adapted to be exposed to combustion chamber pressure and output a first electrical signal indicative of the change in pressure in the combustion chamber. An amplifier circuit receives the first electrical signal and transforms the first electrical signal into a second electrical signal indicative of the pressure in the combustion chamber. The method comprises the selection of one of the first or second electrical signals to determine either the change in pressure in the combustion chamber or the absolute pressure in the combustion chamber.

BRIEF DESCRIPTION OF THE DRAWINGS

FIG. 10 shows alternate times $T_i$ wherein the second time may be predetermined as shown in Table 6 shown in FIG. 17.

FIG. 11 shows Formula 1 which can be used to generate a reference time T.

FIG. 12 shows Table 1, which shows sample functions to calculate detecting crank angles $\theta_i$ based on the engine speed R.

FIG. 13 shows Table 2, which shows sample functions to calculate detecting times $T_i$ based on Formula 1, also a function of engine speed R.

FIG. 14 shows Table 3, which shows alternate functions for crank angles $\theta_i$ without the engine speed R.

FIG. 15 shows Table 4, which shows the derivation of alternate interval T' for positive-to-negative pulses using a predetermined angle $\theta_T$.

FIG. 16 shows Table 5, which shows the derivation of the first angle if the second angle is biased and refers to the embodiment of FIG. 9.

FIG. 17 shows Table 6, which shows the derivation of the first time if the second time is predetermined, as shown in the embodiment of FIG. 10.

DETAILED DESCRIPTION OF THE INVENTION

Figure 1:
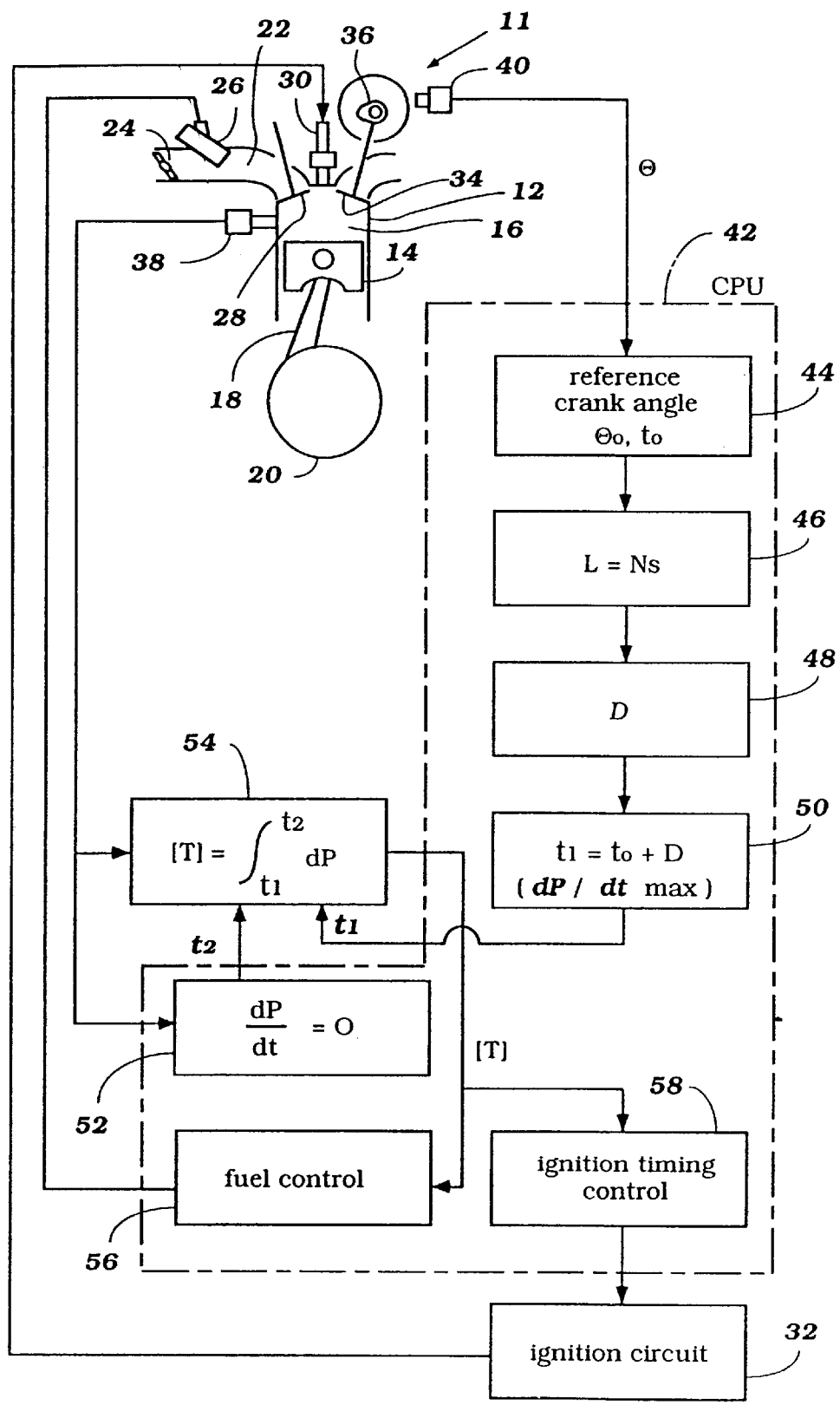
FIG. 1 is a block diagram and partial schematic of an embodiment of the invention.

The measurement of the torque of an internal combustion engine for a motor vehicle is desirable for control of the fuel injection and ignition timing, control of the EGR flow rate, control of the secondary airflow rate to add to the exhaust gas, and, for an engine with variable valve timing, control of the opening and closing times of the intake and exhaust valves. Referring now in detail to FIG. 1, a four-cycle engine is indicated generally by reference numeral 11 and is shown as a cross-section through a single cylinder. Since the internal details of the engine 11 are not necessary to understand the construction and operation of the invention, they will be described only summarily and by reference to a schematic drawing. Where a detailed description is omitted, it may be considered to be conventional.

The engine 11 includes a cylinder block 12 having one or more cylinder bores in which pistons 14 are supported for reciprocation. The pistons 14 and cylinder bores, as well as an attached cylinder head, define a combustion chamber 16. The pistons 14 are connected by means of connecting rods 18 to the throws of a crankshaft, indicated generally by the reference numeral 20, and supported within a crankcase in a known manner.

A fuel-air charge is delivered to the combustion chambers 16 through an induction system that includes an air cleaner (not shown), which draws atmospheric air and delivers it to an induction manifold 22. A flow-controlling throttle valve 24 is provided in the induction manifold 22. This charge-forming system thus supplies an air charge to the intake manifold 22 and includes an electronically-operated fuel injector 26 having a discharge nozzle (not shown) that sprays fuel into the intake manifold 22 downstream of the throttle valves 24. Although manifold injection is disclosed, it is to be understood that the invention may also be employed in conjunction with direct cylinder injection or other types of charge-forming systems, such as carburetors or the like.

The charge formed in the induction system is then delivered to the combustion chamber through the intake manifold 22 and past an intake valve 28 operated by an overhead mounted camshaft (not shown). The charge is compressed in the combustion chambers 16. This charge is then fired by a spark plug 30 mounted in the cylinder head of the engine and having its spark gap extending into the combustion chamber 16. An ignition coil (not shown) is connected to the spark plug 30 for its firing, and the ignition coil is controlled by an ignition circuit 32. The burnt charge is discharged past exhaust valves 34 operated by an overhead exhaust camshaft 36 to an exhaust system (not shown). The fuel injector 26 and ignition system are controlled by an air-fuel ratio control unit, the construction of which may be considered to be conventional, and therefore details of its construction will not be discussed further except insofar as how the invention can be practiced with such conventional control systems.

The engine torque-detecting system employs a pair of sensors one of which is a combustion chamber pressure sensor 38 which may be of the piezoelectric type and which produces a first electrical signal indicative of change in pressure, which is normally interconnected with a charge amplifier so as to produce, as an output, second electrical signal indicative of pressure. This pressure signal may be employed for certain types of controls but in accordance with a feature of the invention, the direct output of the piezoelectric device of the sensor 38 is employed for measuring the torque of the engine. By using the direct output of the piezoelectric device 38, the output signal is indicative of a change or differential in pressure rather than absolute pressure and this is important in being able to practice the invention and measure output torque, as will be described.

In addition, the engine is provided with a crank reference angle sensor 40 which is employed to provide signals for other controls for the engine indicative of position of the shaft or by counting the pulses in a given time the average shaft speed. In conjunction with the torque measuring aspect, the output of this position sensor is utilized so as to measure engine speed during single cycle of operation so as to permit the accurate determination of the engine output torque. Again, this will be described in more detail later but in accordance with a feature of the invention the reference angle signal is associated with one of the camshafts, in this case the exhaust camshaft 36 which like the intake camshaft (not shown) is driven in a suitable manner from the crankshaft 20 at one-half crankshaft speed. By operating this sensor from the camshaft rather than the crankshaft it is possible to measure the speed at top dead center at the time when combustion is occurring without having to discriminate between the cycle when the engine fires and the portion of the cycle when the engine does not fire.

It has been determined that the engine output torque may be accurately determined during each cycle of operation of the engine by taking measurements at 2 finite crank angle or time positions and either integrating the output of the piezoelectric sensor 38 during this time period or actually comparing actual pressure measurements at the two time periods. The embodiment of FIGS. 1 and 2 uses the former method and selects as the two time periods the time when the change in combustion chamber pressure in relation to time (dP/dt) is at its maximum (pressure increase rate is the greatest) and at another time when the change in pressure in relation to time (dP/dt) is zero (this being the point of maximum pressure, as will be seen hereinafter). Also, rather than measuring the initial time $t_1$ when the change in pressure is the greatest, it is possible to make a calculation indicative of the crank angle position when this condition will occur, as will become apparent by the following description.

Referring now again to FIG. 1, an engine control unit 42, or CPU, may be of- the preferred construction as shown. Other engine control or protection systems may be incorporated in the CPU 42, but these embodiments will not be detailed in the discussion of the present invention which deals only with the way engine torque is measured to permit lean burn operation with maximum stability. Of course other applications for this principle will present themselves Lo those skilled in the art.

As shown in FIG. 1, the CPU 42 may first include a means 44 to determine the reference crank angle $\theta_0$, occurring at the time $t_0$. Second, a means 46 to calculate the reference time L for the engine to rotate through a known angle and hence instantaneous speed $N_S$. Third, a means 48 to calculate the time D from the reference crank angle position $t_0$ to the time $t_1$, where it will be known that dP/dt is maximum. From the calculation of the time D it is possible to determine at a stage 50 of the CPU 42 the time $t_1$ when the change in pressure is maximum.

Figure 2:
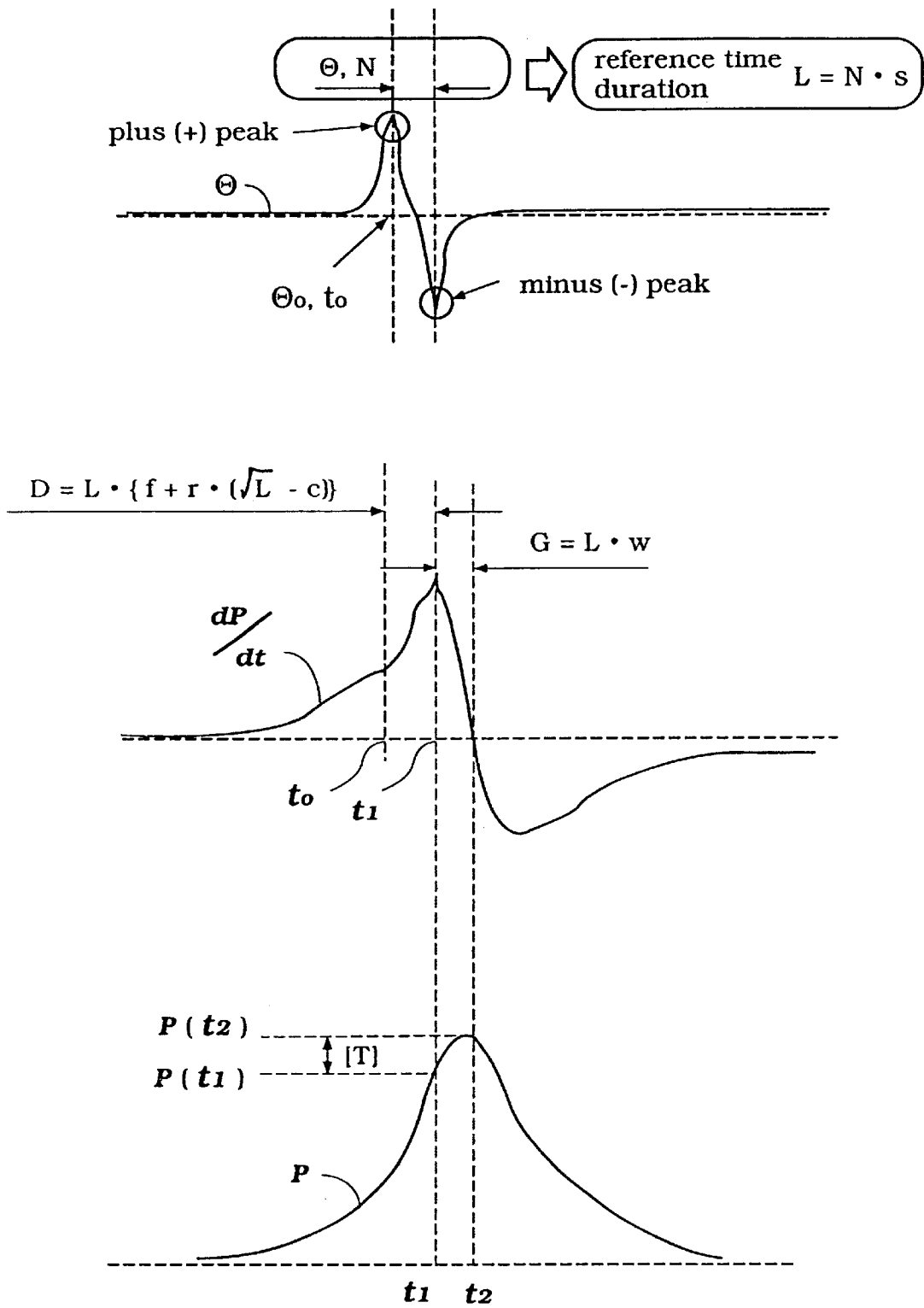
FIG. 2 shows the time histories demonstrating operation of the embodiment of FIG. 1.

These relationships can be best understood by reference to FIG. 2 which shows, among other things, the output signal from the crank or camshaft angle sensor 40 (curve A). The camshaft angle sensor 40 is comprised of a permanent magnet that is affixed at a point on the camshaft 36 which is indicative of top dead center position after the intake valve has closed and when combustion has been initiated. This magnet cooperates with a winding that is fixed relative to the engine in proximity to the camshaft 36 and which will output first a positive output signal when the magnet passes it and then a signal which diminishes to a maximum negative value when the camshaft 36 has rotated through a predetermined crank angle $\theta$ from the initial crank angle $\theta_0$ at the time $T_0$. This rotational angle $\theta_N$ is then used at the stage 46 so as to determine the time duration L that it takes the engine shaft (camshaft 36 in this embodiment) to rotate through this angle and this speed $N_S$. This time is calculated by using a timer that outputs a number of equal time pulses and the number of pulses for the camshaft to rotate through the angle $\theta_N$ is determine by the output of the counter. This in essence gives an instantaneous crankshaft speed and the time period L can be employed to determine from known parameters the time delay D after $T_O$ when the maximum change in pressure will occur from the following equation:

$$D = L \cdot [f + r \cdot (\sqrt{L} - C)]$$

In the foregoing equation, the factors f, r, and c are all constants which can be determined experimentally.

As has been previously noted, it would be possible to measure the point $t_1$ by checking the output of the piezoelectric part of the pressure sensor 38, but it is equally as acceptable to calculate this time from the aforenoted equation and thus simplify the overall control circuitry.

Thus, at the stage 50 of the CPU 42 the time $t_1$ is calculated as being equal to the following equation:

$$t_1 = t_0 + D$$

This time signal $t_1$ is outputted to an integrating circuit 54 so as to open a gate and permit this integrating circuit 54 to receive the output signal from the piezoelectric device of the pressure sensor 38 so as to perform an integrating function as follows:

$$T(torque) = \int_{t_1}^{t_2} dP$$

This integrating circuit 54 is shut off by a shut-off device 52 which shuts off the gate when the output from the piezoelectric device of the pressure sensor 38 indicates that dP/dt=0, this being the time $t_2$ on the pressure curve shown in the FIG. 2C and also the time when the change in pressure from the combustion chamber pressure sensor 38 in relation to time reaches 0. This time interval G is also equal to L·w where a is a constant and L is the value previously calculated by determining the speed of rotation of the camshaft.

The integrating function occurring at the stage 54 thus calculates output torque from an equation that can be determined experimentally and then output signals are outputted to a fuel control circuit, indicated at 56 and an ignition timing control circuit 58 which controls the firing of the spark plug 30 through the ignition circuit 32. This can be done in accordance with any desired control strategy.

Figure 3:
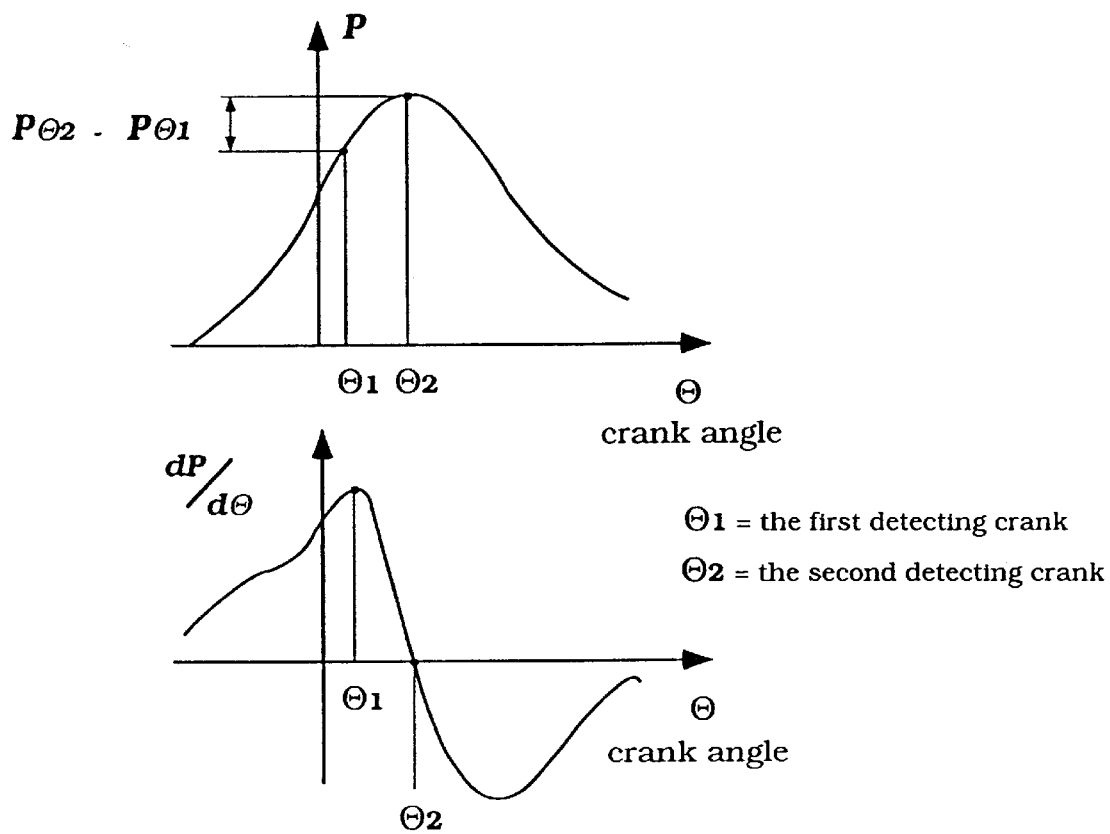
FIG. 3 shows crank angle histories of the combustion pressure $P_\theta$ and $dP/d\theta$ and the two detecting crank angles $\theta_1$, $\theta_2$ for the output torque [T].

In the previously described embodiment, two specific time intervals were chosen depending upon the rate of change of pressure in the combustion chamber and the pressure variations during this time period were integrated to determine torque. It has also been determined that torque can be accurately determined by measuring the actual difference in pressure signals from the pressure sensor 38 at two different time intervals or degrees of crankshaft rotation during each cycle of engine operation so long as the angular positions are accurately chosen. These two crankshaft measurement angles $\theta_1$ and $\theta_2$ may be determined to be the points in time when the change in pressure in relation to time or crank angle is at a maximum and 0, respectively as with the previously described embodiments. These points are not determined by actual pressure measurements but merely by crank angles. This may be seen by reference to FIG. 3 which shows the combustion pressures as functions of the crank angles $\theta_i$. The first angle $\theta_1$ may be chosen as the position near to the top dead center (TDC) of the piston stroke; the other angle $\theta_2$ may be 10 to 20 degrees after the TDC. Here, $\theta_1$ is the crank angle corresponding to time $t_1$ and crank angle $\theta_2$ corresponds to time $t_2$. The pressure differential $dP/d\theta$ may then be derived from the aforementioned angle-time relationships and shown as in the lower curve of FIG. 3, as a function of crank angle $\theta$.

In determining the time or crank angles $\theta_1$ and $\theta_2$ when the pressure measurements are made it has to be borne in mind that the change in pressure in the combustion chamber is a function of when spark timing occurs. That is, the pressure begins to rise rapidly whence the spark plug is fired after the intake valve has been closed. Thus, in order to practice this embodiment of the invention it is desirable to vary the angles $\theta_1$ and $\theta_2$ in response to the change in spark timing. Most engines operate with timing curves that vary in relation to engine speed R and hence the shift in the measurement angles $\theta_1$, and $\theta_2$ can be varied in response to engine speed. Table 1 as shown in FIG. 12 and reproduced below shows a number of variations in which this may be done in relation to engine speed R. In this table the values of $\theta_x$, $\alpha$, $\beta$ and $\phi$ are constant and $\theta_0$ is the reference angle position when the camshaft position sensor 40 outputs its maximum plus signal as seen in FIG. 2A.

TABLE 1

$$\begin{pmatrix} \theta_1 = \theta_0 + \theta_x - UR \\ \theta_1 = \theta_0 + \dfrac{\alpha}{R} \\ \theta_1 = \theta_0 + \dfrac{\alpha}{\sqrt{R}} \\ \theta_1 = \theta_0 + \dfrac{\alpha}{\log}R \end{pmatrix} \quad \begin{pmatrix} \theta_2 = \theta_1 + \beta \\ \theta_2 = \theta_1 + \beta - \alpha \cdot R \\ \theta_2 = \theta_1 + \beta + \dfrac{\alpha}{R} \\ \theta_2 = \theta_1 + \beta + \dfrac{\alpha}{\sqrt{R}} \\ \theta_2 = \theta_1 + \beta + \dfrac{\alpha}{\log}R \end{pmatrix}$$

Figure 4:
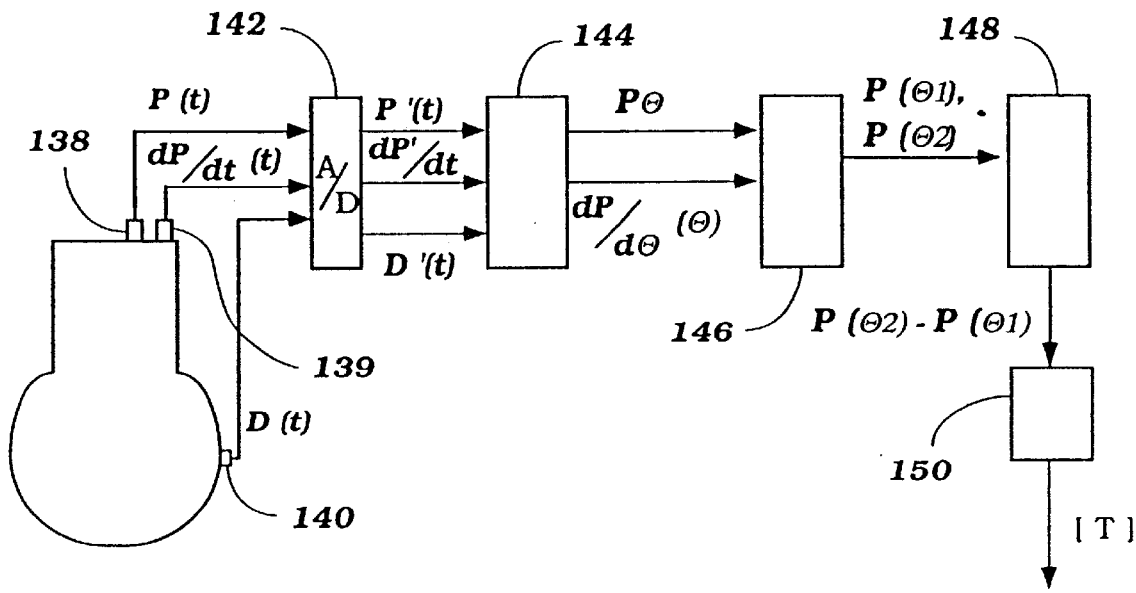
FIG. 4 is a block diagram of a second embodiment of the invention, whereby pressure and rate of pressure signals are used to determine the output torque [T].

It is also possible to practice the invention by actually measuring the points when the change in pressure in relation to time or crank angle is the maximum and when it is 0 by actually measuring these conditions. As has been noted, the output of the piezoelectric sensor portion of the pressure sensor 38, shown schematically at 139 in FIG. 4 is indicative of dP/dt while the actual output of the sensor and its amplifier, indicated schematically at 138 in FIG. 4 is indicative of the actual combustion chamber pressure P. The system shown in FIG. 4 can be employed to measure the pressure at the maximum pressure change condition and the second maximum pressure by actually determining when these pressure conditions occur. This is done by using the pressure value detected by the pressure sensor 138, when the value dP/dt detected by the dP/dt sensor 139 is maximum and a maximum pressure when the value of the dP/dt sensor 139 is zero. The estimated output torque [T] is then calculated by the difference between the higher pressure and the lower pressure.

The structure for doing this is as shown in FIG. 4. An analog-to-digital converter (A/D) 142, is used to provide digitized input to a data converter 144, which generates the parameters as a function of the crank angle $\theta$. These parameters, $P(\theta)$ and $dP/d\theta(\theta)$, are used by a data selector means 146 to determine the values $P(\theta_1)$ and $P(\theta_2)$. These values at the appropriate angle times may then be incorporated in the calculating elements 148, 150 to generate the difference between these pressures, which is used to calculate engine torque [T].

Of course, in the system shown in FIG. 4, the computer must have a program and memories to determine when the value dP/dt is maximum and also if it is 0 so as to select the two measurements at the points $\theta_1$ and $\theta_2$ as shown in FIG. 4. Of course, this is well within the scope of those skilled in the computer art.

Figure 5:
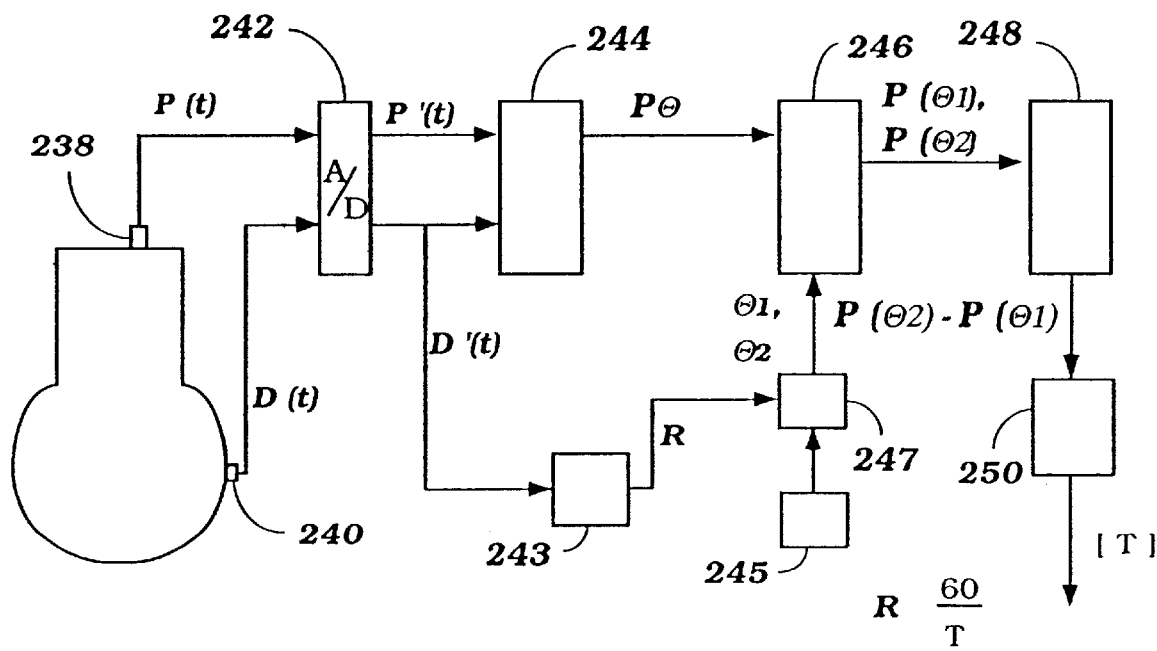
FIG. 5 is a third embodiment of the invention where one sensor value of either pressure P or $dP/d\theta$ is predetermined and corresponds to a function represented in either Table 1, shown in FIG. 12 or Table 3, shown in FIG. 14.

As has been noted in conjunction with the description of the embodiment involving the use of Table 1 as shown above and in FIG. 12, it is possible to have the system merely preprogrammed for the angles $\theta_1$ and $\theta_2$ when the pressure or change in pressure measurements are made. These points in time can be determined experimentally by actual engine testing and then programmed into the computer. Such another embodiment of the invention is depicted in FIG. 5, whereby the crank angles $\theta_i$ for the detecting pressures, or the detecting times, are based on the engine speed R. A TDC angle sensor 240 is utilized in conjunction with a chamber pressure sensor 238 and a A/D element 242 to generate the digital signals. A data converter 244 next generates the pressure as a function of crank angle $\theta$, while a calculating means 243 generates the engine speed R, which may be determined as a function of the interval of the dead center pulses. Sample values of the functions for the crank angles $\theta_1$ and $\theta_2$ may be as shown in Table 1, and the values for constants $\alpha$, $\beta$ and $\gamma$ are kept in a memory element 245. The functions shown in FIG. 12, Table 1 may then be combined with the engine speed information in a calculating element 247; the resultant angles $\theta_1$ and $\theta_2$ are then utilized in a data selector unit 246, which determines the corresponding pressures at those angles. Calculating means 248, 250 then generate the difference between the pressures to output the estimated engine torque [T].

In the embodiment shown in FIG. 5, the system operates by having a series of measured crank angles at which point the pressure or change in pressure must be measured in order to obtain the torque reading.

Figure 6:
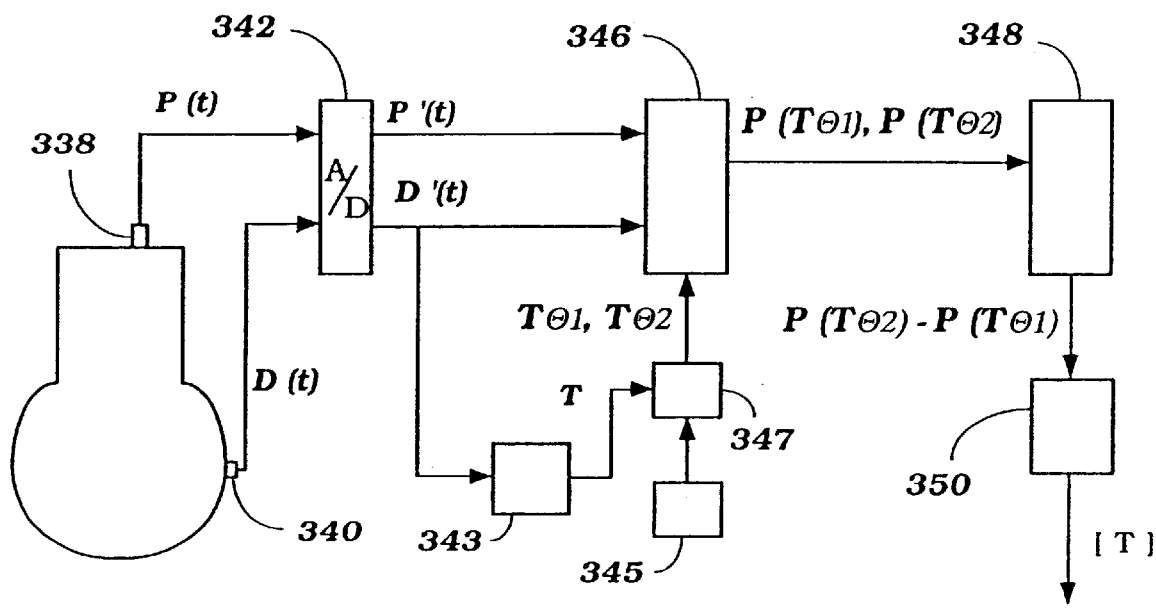
FIG. 6 is a fourth embodiment of the invention corresponding to functions represented in Table 2 shown in FIG. 13 and Formula 1 shown in FIG. 11.

The embodiment of FIG. 6 does not utilize engine speed information. A TDC angle sensor 340 and a chamber pressure sensor 338 are processed by an A/D unit 342 to generate digitized values; the discrete angle sensor value is then used to generate a reference time T in a calculating element 343 based on Formula 1, as set out below and reproduced in FIG. 11

$$T\theta_1 = T\theta_0 + T_{\alpha R} = \frac{T\theta_0}{360} + \frac{T \times \alpha \times R}{360} = \frac{1}{360}\left(T \times \theta_0 + T \times \alpha \times \frac{60}{T}\right) = \mu T + \nu,$$ FORMULA 1 wherein $\mu$ and $\nu$ are constants. As shown in Table 2, as set out below and reproduced in FIG. 13 sample functions are used to determine the times for the detecting crank angles $\theta_1$ and $\theta_2$, which are based on predetermined constants $\mu$, $\nu$, $\gamma$ and $\kappa$.

TABLE 2

$$\begin{pmatrix} T\theta_1 = \mu T + \nu \\ T\theta_1 = \mu T + \nu T^2 \\ T\theta_1 = \mu T + \nu T\sqrt{T} \\ T\theta_1 = \mu T + \nu \frac{T}{\log T} \end{pmatrix} \quad \begin{pmatrix} T\theta_2 = T\theta_1 + \lambda T \\ T\theta_2 = T\theta_1 + \lambda T + K \\ T\theta_2 = T\theta_1 + \lambda T + KT^2 \\ T\theta_2 = T\theta_1 + \lambda T + KT\sqrt{T} \\ T\theta_2 = T\theta_1 + \lambda T + K\frac{T}{\log t} \end{pmatrix}$$

These values are stored in a memory 345 and used in a calculating means 347 to determine times $T_{\theta 1}$ and $T_{\theta 2}$ for the corresponding angles $\theta_1$ and $\theta_2$. A data selector unit 346 next determines the pressures at the selected times of the selected crank angles, which pressures then go into calculating means 348,350 to determine the difference in the pressures and the estimated engine torque [T].

Figure 8:
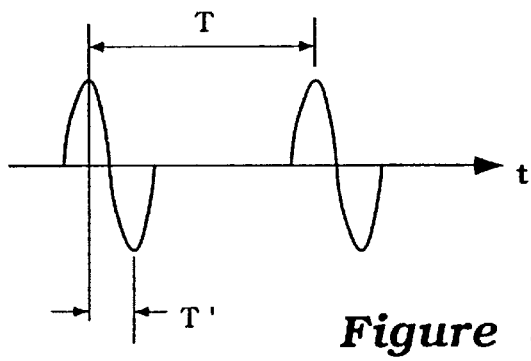
FIG. 8 shows an alernate time T' of positive-to-negative pulses instead of the time between positive top dead center pulses T; this correspondence is represented in Table 4 shown in FIG. 15.

In the discussion previously when reference has been made to engine speed R, the engine speed R has been generally considered the speed that requires the engine to rotate through a complete or series of revolutions. The normal output pulses from a crankshaft rotational speed sensor are measured and summed in a time period to determine engine speed as shown by the distance T in FIG. 8 which shows successive pulses during a complete revolution either of the crankshaft or, in the embodiments as described, of the camshaft. However, as was noted in the earlier discussion, it is possible to make an instantaneous time determination T' of a shorter time interval between when the output pulse is at a maximum and minimum. This may be utilized to shorten the sample time interval required for the aforementioned calculations and if this data is used, then some of the tables must be modified for this measure of calculation. See for example Table 3, which is shown in FIG. 14 and reproduced below, that could be utilized with the embodiment of FIG. 5 wherein different values are given for the variable constants dependent upon this information.

TABLE 3

$$\begin{pmatrix} \theta_1 = \theta_0 + \theta_R - \frac{\alpha^1}{T} \\ \theta_1 = \theta_0 + \alpha^1 T \\ \theta_1 = \theta_0 + \alpha^1 \sqrt{T} \\ \theta_1 = \theta_0 - \alpha^1 \frac{1}{\log T} \end{pmatrix} \quad \begin{pmatrix} \theta_2 = \theta_1 T \beta^1 \\ \theta_2 = \theta_1 T \beta^1 - \frac{\alpha^1}{T} \\ \theta_2 = \theta_1 + \alpha^1 T \\ \theta_2 = \theta_0 + \alpha^1 \sqrt{T} \\ \theta_1 = \theta_0 + \beta^1 - \alpha^1 \frac{1}{\log T} \end{pmatrix}$$

Figure 7:
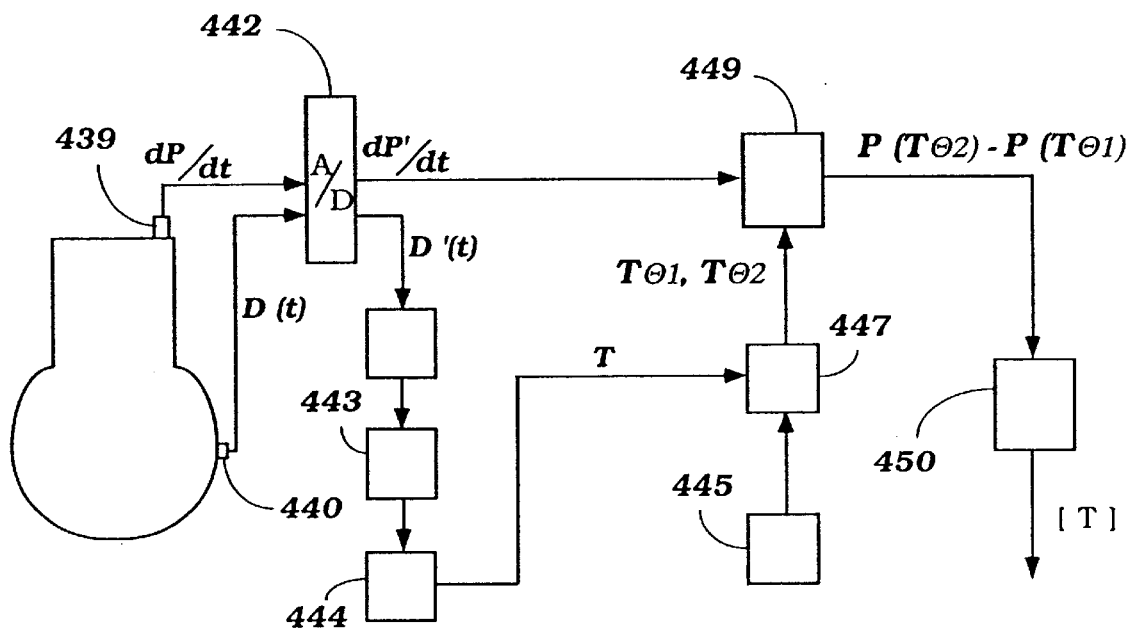
FIG. 7 is a fifth embodiment of the invention incorporating the functions in Table 4 shown in FIG. 15.

An embodiment using this time T' is shown in FIG. 7, whereby a crank angle sensor 440 is utilized along with a pressure rate sensor 439. The values are processed through an A/D unit 442, and the resulting digitized angle is processed in a detector element for T' 443.

Referring to Table 4, shown in FIG. 15 and also set out below, a value for T is determined in a calculating means 444. Referring again to Table 2, the constants $\mu$, $\nu$, $\gamma$ and $\kappa$, in a memory 445, are utilized with time T in a calculating element 447 to generate the times $T_{\theta i}$ for angles $\theta_1$ and $\theta_2$. An integrating element 449 is utilized to determine the pressures at the crank angle times by integrating the rate values from the time $T_{\theta 2}$ to the $T_{\theta 2}$ directly to output the signal $P_{(T01)} - P_{(T02)}$ to the calculating means 450. Calculating means 450 determines the estimated engine torque value [T] from this data.

TABLE 4

$$R = \frac{60 \times \theta T}{360 \times T^1} = \frac{\theta T^1}{60 T^1}$$

$$T = \frac{360}{\theta T^1} T^1$$

Figure 9:
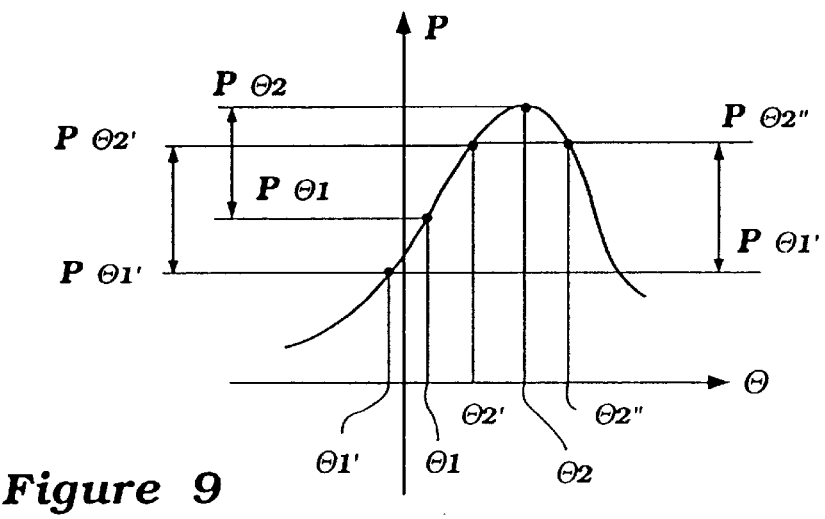
FIG. 9 shows alternate crank angles $\theta_i$ wherein the second angle is biased and the first angle is compensated as shown in Table 5 shown in FIG. 16.

As previously noted, because the ignition timing is controlled relative to the engine speed R, it is shown in Table 1 that the crank angles for the detecting pressures, or the detecting times, may be chosen by the CPU 42 based upon the engine speed R, and at a low engine speed both of the times or angles may be delayed, while at a high engine speed they may be advanced. As shown in Table 1, $\theta_x$, $\alpha$, $\beta$, and $\gamma$ are all constant values. The detecting crank angles may be changed as shown in FIG. 9 and Table 5 set out below and reproduced in FIG. 16. If a second detecting crank angle $\theta_2$ is biased by a delta value ($\Delta \theta$), the first detecting crank angle would then be advanced by a value equal to a constant C multiplied by this delta value, where C is a value less than one.

TABLE 5

$$\theta_2 - \theta_2^1 = \Delta \theta \rightarrow \theta_1 - \theta_1^1 = C \cdot \Delta \theta$$

$$\theta_2^{11} - \theta_2 = \Delta \theta^1 \rightarrow \theta_1 - \theta_1^1 = C^1 \cdot \Delta \theta^1$$

$$C < 1$$

$$C^1 < 1$$

Similarly, as shown in FIG. 10 and Table 6, shown below and in FIG. 17, the detecting times may be changed. A calculating program may choose $T_{\theta'2}$ or $T_{\theta''2}$ (which is predetermined) instead of $T_{\theta 2}$ as a second detecting time. In this case, $T_{\theta'1}$ must be used as the first detecting time.

TABLE 6

$$T\theta_2 - T\theta_2' = \Delta T\theta \quad T\theta_1 - T\theta_1' = C \cdot \Delta T\theta \quad C < 1$$

$$T\theta_2'' - T\theta_2 = \Delta T\theta^1 \quad T\theta_1 - T\theta_1' = C' \cdot \Delta T\theta^1 \quad C' < 1$$

The preferred and alternate embodiments previously described demonstrate that the use of one or two crank angle sensors yields several possibilities for the generation of an engine torque value. It has also been indicated that the crank angle sensor, in addition to providing a signal indicative of crank angle, can be utilized to provide an indication of accurate instantaneous engine shaft speed. Although in the illustrated embodiments this has been done with one sensor, it is to be understood that a number of such sensors may be positioned at spaced intervals around the shaft so as to measure instantaneous shaft speeds at desired shaft angles. Various other changes and modifications may be made from the embodiments presented herein without departure from the spirit and scope of the invention, as defined by the appended claims.

What is claimed:

1. A method for measuring output torque of an internal combustion engine during a single cycle of operation wherein the engine comprises a combustion chamber and an output shaft driven by combustion occurring in the combustion chamber, said method comprising the steps of taking a specific number of measurements of instantaneous pressure conditions directly in the combustion chamber only at spaced time intervals between two output shaft angles during only a portion of a complete cycle of operation and for less than the complete cycle and computing torque of the engine for the complete cycle from such specific number of separate instantaneous measurements.

2. The method as set forth in claim 1, wherein change in pressure in the combustion chamber is measured.

3. The method as set forth in claim 2, wherein torque is computed by summing the change in pressure during a time period between the two specific output shaft angles.

4. The method as set forth in claim 3, wherein one of the specific output shaft angles is the angle when change in pressure is greatest.

5. The method as set forth in claim 4, wherein the other specific output shaft angle is the output shaft angle where maximum pressure exists and rate of change of pressure is zero.

6. The method as set forth in claim 5, wherein one of the specific output shaft angles is computed from known data.

7. The method as set forth in claim 6, wherein the first occurring output shaft angle is the computed one.

8. The method as set forth in claim 7, wherein the computed angle is computed by determining speed of rotation of the output shaft.

9. The method as set forth in claim 8, wherein speed of rotation of the output shaft is measured by a sensor that provides a single pulse during one rotation of the shaft.

10. The method as set forth in claim 9, wherein speed is calculated by measuring angular rotational speed of the output shaft for less than one complete revolution by sensing change of the pulse and determining the angle which the shaft rotates for the pulse to change.

11. The method as set forth in claim 1, wherein one of the output shaft angles is the angle when change in pressure is the greatest.

12. The method as set forth in claim 11, wherein the other output shaft angle is the output shaft angle where maximum pressure exists and rate of change of pressure is zero.

13. The method as set forth in claim 12, wherein one of the output shaft angles is computed from known data.

14. The method as set forth in claim 13, wherein the first occurring output shaft angle is the computed one.

15. The method as set forth in claim 14, wherein the computed angle is computed by determining speed of rotation of the output shaft.

16. The method as set forth in claim 15, wherein speed of rotation of the output shaft is measured from a sensor that provides a single pulse during one rotation of the output shaft.

17. The method as set forth in claim 16, wherein the speed is calculated by measuring angular rotational speed of the output shaft for less than one complete revolution by sensing change of the pulse and determining the angle which the shaft rotates for the pulse to change.

18. The method as set forth in claim 1, wherein actual pressure in the combustion chamber is measured.

19. The method as set forth in claim 18, wherein the torque is determined by measuring differences in pressure in the combustion chamber at the two specific output shaft angles.

20. The method as set forth in claim 19, wherein the two specific output shaft angles are selected as an angle immediately before top dead center and another angle in the range of 10° to 20° after top dead center.

21. The method as set forth in claim 20, wherein the specific output shaft angles are varied depending upon speed of the engine.

22. The method as set forth in claim 21, wherein the engine is a spark ignited engine and spark timing is also varied with engine speed.

23. The method as set forth in claim 21, wherein speed of rotation of the output shaft is measured by a sensor that provides a single pulse during one rotation of the shaft.

24. The method as set forth in claim 23, wherein speed is calculated by measuring the angular rotational speed of the shaft for less than one complete revolution by sensing change of the pulse and determining the angle which the shaft rotates for the pulse to change.

25. The method as set forth in claim 1, wherein the two specific output shaft angles are specific as an angle immediately before top dead center and another angle in the range of 10° to 20° after top dead center.

26. The method as set forth in claim 25, wherein the specific output shaft angles are varied depending upon speed of the engine.

27. The method as set forth in claim 26, wherein the engine is a spark ignited engine and spark timing is also varied with engine speed.

28. The method as set forth in claim 26, wherein speed of rotation of output shaft is measured from a sensor that provides a single pulse during one rotation of the output shaft.

29. The method as set forth in claim 28, wherein speed is calculated by measuring angular rotational speed of the output shaft for less than one complete revolution by sensing change of the pulse and determining the angle which the output shaft rotates for the pulse to change.

30. An apparatus for measuring torque of an internal combustion engine comprising a combustion chamber, an output shaft driven by combustion in the combustion chamber, means for measuring an instantaneous pressure condition directly in said combustion chamber, means for sensing output shaft angle, and means for reading the instantaneous pressure condition in said combustion chamber from said pressure sensor only between two specific output shaft angles occurring during only a portion of a complete cycle of operation and for less than a complete cycle and computing engine output torque for the complete cycle from said instantaneous pressure condition measurements.

31. The apparatus as set forth in claim 30, wherein change in pressure in the combustion chamber is measured.

32. The apparatus as set forth in claim 31, wherein torque is computed by an integrator that integrates change in pressure during the time period between the two specific output shaft angles.

33. The apparatus as set forth in claim 32, wherein one of the output shaft angles is the angle when the change in pressure is greatest.

34. The apparatus as set forth in claim 33, wherein the other output shaft angle is the output shaft angle where maximum pressure exists and rate of change of pressure is zero.

35. The apparatus as set forth in claim 34, wherein one of the output shaft angles is computed from known data.

36. The apparatus as set forth in claim 35, wherein the first occurring output shaft angle is the computed one.

37. The apparatus as set forth in claim 36, wherein the computed angle is computed by determining speed of rotation of the output shaft by a speed sensor.

38. The apparatus as set forth in claim 37, wherein the speed sensor provides a single pulse during one rotation of the output shaft.

39. The apparatus as set forth in claim 38, wherein the speed is calculated by measuring angular rotational speed of the shaft for less than one complete revolution by sensing change of the pulse and determining the angle which the shaft rotates for the pulse to change.

40. The apparatus as set forth in claim 30, wherein one of the output shaft angles is the angle when change in pressure is the greatest.

41. The apparatus as set forth in claim 40, wherein the other output shaft angle is output shaft angle where maximum pressure exists and rate of change of pressure is zero.

42. The apparatus as set forth in claim 41, wherein one of the output shaft angles is computed from known data.

43. The apparatus as set forth in claim 42, wherein the first occurring output shaft angle is the computed one.

44. The apparatus as set forth in claim 15, wherein the computed angle is computed by determining speed of rotation of the output shaft.

45. The apparatus as set forth in claim 44, wherein the speed sensor provides a single pulse during one rotation of the output shaft.

46. The apparatus as set forth in claim 45, wherein speed is calculated by measuring angular rotational speed of the output shaft for less than one complete revolution by sensing change of the pulse and determining the angle which the output shaft rotates for the pulse to change.

47. The apparatus as set forth in claim 30, wherein the actual pressure in the combustion chamber is measured.

48. The apparatus as set forth in claim 47, wherein torque is determined by measuring difference in pressure in the combustion chamber at the two specific output shaft angles.

49. The apparatus as set forth in claim 48, wherein the two specific output shaft angles are selected as an angle immediately before top dead center and another angle in the range of 10° to 20° after top dead center.

50. The apparatus as set forth in claim 49, wherein the specific output shaft angles are varied depending upon speed of the engine.

51. The apparatus as set forth in claim 50, wherein the engine is a spark ignited engine and spark timing is also varied with engine speed.

52. The apparatus as set forth in claim 30, wherein the output shaft angle sensor provides a single pulse during one rotation of the shaft.

53. The apparatus as set forth in claim 52, wherein speed is calculated by measuring angular rotational speed of the output shaft for less than one complete revolution by sensing change of the pulse and determining the angle which the shaft rotates for the pulse to change.

54. The apparatus as set forth in claim 30, wherein the two specific output shaft angles are selected as an angle immediately before top dead center and another angle in the range of 10° to 20° after top dead center.

55. The apparatus as set forth in claim 54, wherein the specific output shaft angles are varied depending upon speed of the engine.

56. The apparatus as set forth in claim 55, wherein the engine is a spark ignited engine and spark timing is also varied with engine speed.

57. The apparatus as set forth in claim 55, wherein speed of rotation of the output shaft is measured by a sensor that provides a single pulse during one rotation of the output shaft.

58. The apparatus as set forth in claim 57, wherein speed is calculated by measuring angular rotational speed of the output shaft for less than one complete revolution by sensing change of the pulse and determining the angle which the shaft rotates for the pulse to change.

* * * * *